(12) United States Patent
Derrick

(10) Patent No.: US 6,739,620 B2
(45) Date of Patent: May 25, 2004

(54) VEHICLE STEERING DEVICE

(75) Inventor: John-Oliver Derrick, Hettstadt (DE)

(73) Assignee: TRW Automative Safety Systems GmbH & Co. KG, Aschaffenburg (DE)

( * ) Notice: Subject to any disclaimer, the term of this patent is extended or adjusted under 35 U.S.C. 154(b) by 49 days.

(21) Appl. No.: 10/103,329

(22) Filed: Mar. 21, 2002

(65) Prior Publication Data

US 2002/0135163 A1 Sep. 26, 2002

(30) Foreign Application Priority Data

Mar. 22, 2001 (DE) .................................. 201 05 002 U

(51) Int. Cl.$^7$ ............................................. B60R 21/16
(52) U.S. Cl. ...................... 280/731; 280/743.1; 74/552
(58) Field of Search .............................. 280/731, 743.1, 280/728.3, 750, 771; 74/552, 492

(56) References Cited

U.S. PATENT DOCUMENTS

| | | | | |
|---|---|---|---|---|
| 3,618,979 A | * | 11/1971 | Gulette | ..................... 280/731 |
| 4,421,960 A | | 12/1983 | Arima et al. | |
| 4,449,728 A | | 5/1984 | Pilatzki | |
| 5,165,302 A | * | 11/1992 | Iwasa et al. | ................... 74/552 |
| 5,691,695 A | * | 11/1997 | Lahiff | ........................ 340/461 |
| 6,099,027 A | * | 8/2000 | Shirk et al. | ............. 280/728.3 |
| 6,394,489 B1 | * | 5/2002 | Faigle et al. | ................ 280/731 |
| 6,474,688 B1 | * | 11/2002 | Bogren et al. | .............. 280/771 |
| 6,550,804 B2 | * | 4/2003 | Burdock | ..................... 280/731 |

FOREIGN PATENT DOCUMENTS

| | | | |
|---|---|---|---|
| DE | 29806461 U1 | 7/1998 | |
| DE | 19749914 A1 * | 5/1999 | ........... B60R/21/16 |
| DE | 29918483 U1 | 4/2000 | |
| DE | 19858835 A1 | 6/2000 | |
| DE | 19904072 A1 * | 8/2000 | ........... B60R/21/20 |
| DE | 20010726 U1 | 10/2000 | |
| EP | 0302193 | 2/1989 | |
| EP | 0523882 | 1/1993 | |
| JP | 2000/118320 | 4/2000 | |
| WO | 97/34783 | 9/1997 | |

OTHER PUBLICATIONS

Pending U.S. Bieber et al. patent application Ser. No. 09/882,155, filed Jun. 15, 2001 entitled Passanger Gas Bag Protection Device, corres. to German Application Nos. 200 10 726.7, filed Jun. 16, 2001; 200 12 077.8, filed Jul. 13, 2000 and 100 65 461.4, filed Dec. 28, 2000.

* cited by examiner

*Primary Examiner*—David R. Dunn
(74) *Attorney, Agent, or Firm*—Tarolli, Sundheim, Covell & Tummino L.L.P.

(57) ABSTRACT

The invention relates to a vehicle steering device comprising a steering wheel which has a gas bag module with a gas bag and a covering cap on a front side. The covering cap closes an outlet opening for the gas bag up to its unfolding. At least one of a display- and operating device is arrange in the covering cap. The outlet opening runs around at least one of the display- and operating device.

13 Claims, 6 Drawing Sheets

VEHICLE STEERING DEVICE

TECHNICAL FIELD

The invention relates to a vehicle steering device.

BACKGROUND OF THE INVENTION

Known vehicle steering devices comprise a steering wheel which has a gas bag module with a gas bag and a covering cap on the front side, the covering cap closing an outlet opening for the gas bag up to its unfolding.

In vehicles, the accommodating of instruments such as for example tachometers, revolution indicators and the like in the instrument panel and also of operating elements is very costly, and furthermore these instruments/operating elements are poorly accessible for repair. Furthermore, the instruments lie behind the steering wheel, so that they only lie in the optimum angle of view for persons of a particular size. In particular, short people can have a restricted view of the instruments owing to the steering wheel.

BRIEF SUMMARY OF THE INVENTION

It is an object of the invention to simplify the equipping of the vehicle with the instrument display and/or operating elements. This is achieved in a vehicle steering device comprising a steering wheel which has a gas bag module with a gas bag and a covering cap on a front side. The covering cap closes an outlet opening for the gas bag up to its unfolding. At least one of a display- and operating device is arranged in the covering cap. The outlet opening runs around at least one of the display- and operating device. The vehicle steering wheel is equipped hitherto only with multifunction switches which adjoin the covering cap laterally. However, it does not serve to accommodate a display- and/or operating device. This has not been considered, because the gas bag module which takes up a large amount of space, tears open almost the entire covering cap and hence the entire hub region of the steering wheel in the case of restraint, so that thereby automatically there is no place available to accommodate the display- and/or operating device. The invention, on the other hand, makes provision that the outlet opening runs around the display- and/or operating device, so that the display- and/or operating device itself remains secured in a stationary manner on the steering wheel even when the covering cap tears open. For the signal transmission, devices are available which have already been developed in connection with the multifunction switches and also in connection with the triggering of the gas generator. The installation of the steering wheel itself is very simple and it can also be easily dismantled, which is a considerable advantage compared with the dismantling of display- and/or operating devices in the instrument panel. The covering cap can have a central depression or opening to house the display- and/or operating device.

Preferably, the outlet opening has a closed ring shape. The gas bag therefore emerges in symmetrical form and centrally, i.e. in the region of the hub, from the gas bag module in the direction towards the occupant.

Preferably the gas bag is also constructed in a ring shape and moves outwards via the outlet opening. The gas bag therefore, in the unfolded state, surrounds the display- and/or operating device which on unfolding of the gas bag remains fastened in a stationary manner on the steering wheel. The gas bag can join together radially inwards on its front wall, so that the indentation is not open from the exterior.

According an embodiment, the display device is a screen to display various vehicle data. The screen is therefore used universally and serves for example to indicate the speed, as a display of a navigation system, radio display, telephone display, WAP screen, PC display, as screen for the transmission/viewing of e-mails, as a touch screen for the combined display and operation of a device or as touch pad for the operating of vehicle elements.

A preferred embodiment makes provision that a steering angle detection sensor is provided which is coupled with the screen via a control arrangement. This control arrangement is engineered and programmed such that it controls the screen so as to be independent of the steering wheel's angular position, i.e. the screen always providing a horizontally aligned display, although the screen rotating together with the steering wheel since it is rigidly coupled with the latter.

DETAILED DESCRIPTION OF THE INVENTION

Figure 1A:
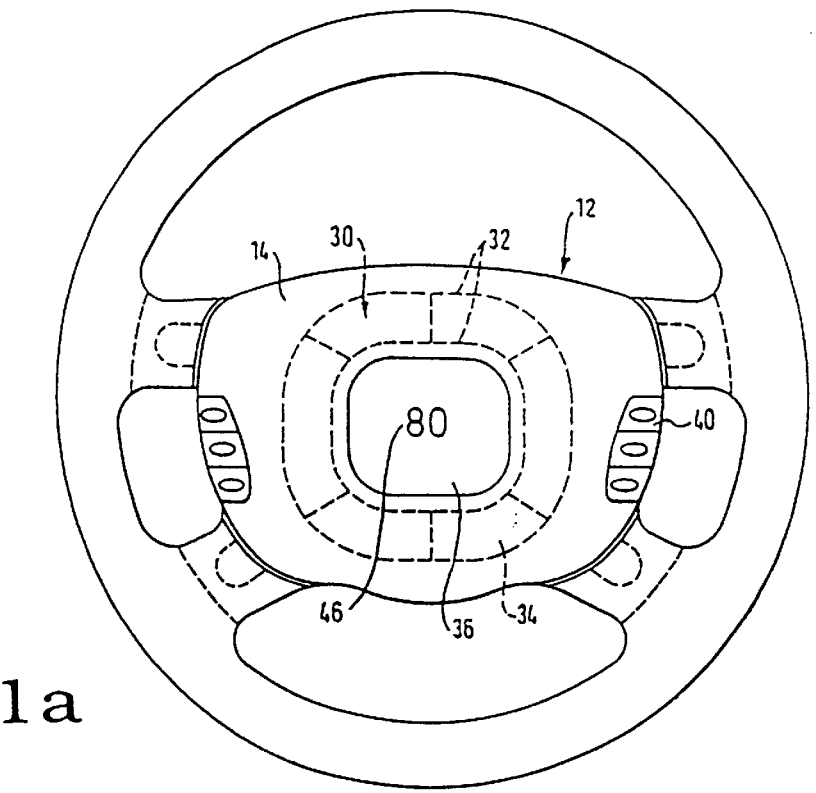
FIGS. 1a and 1b each show a top view onto a steering device according to the invention.
Figure 1B:
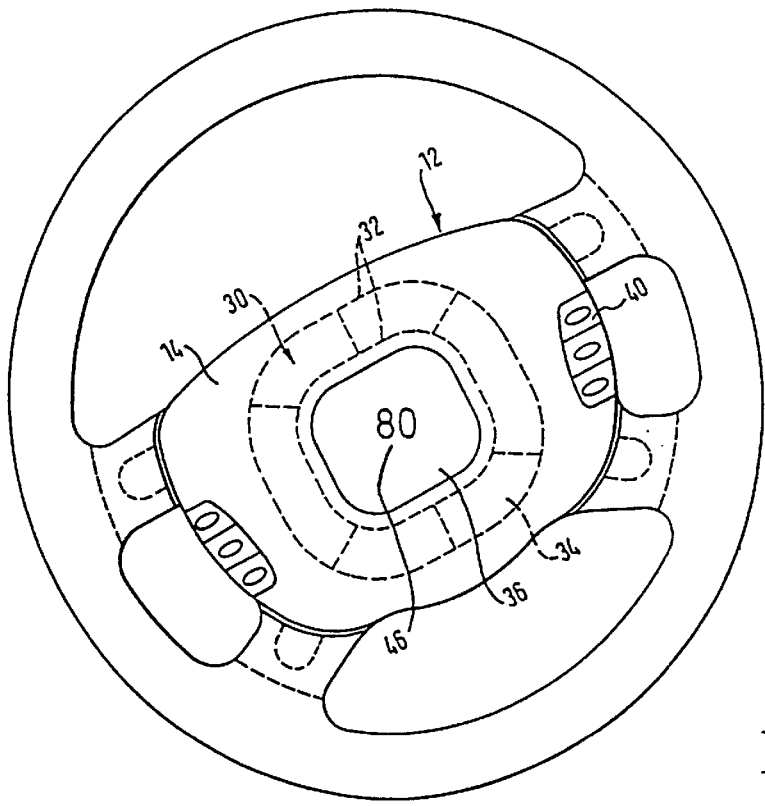
Figure 2:
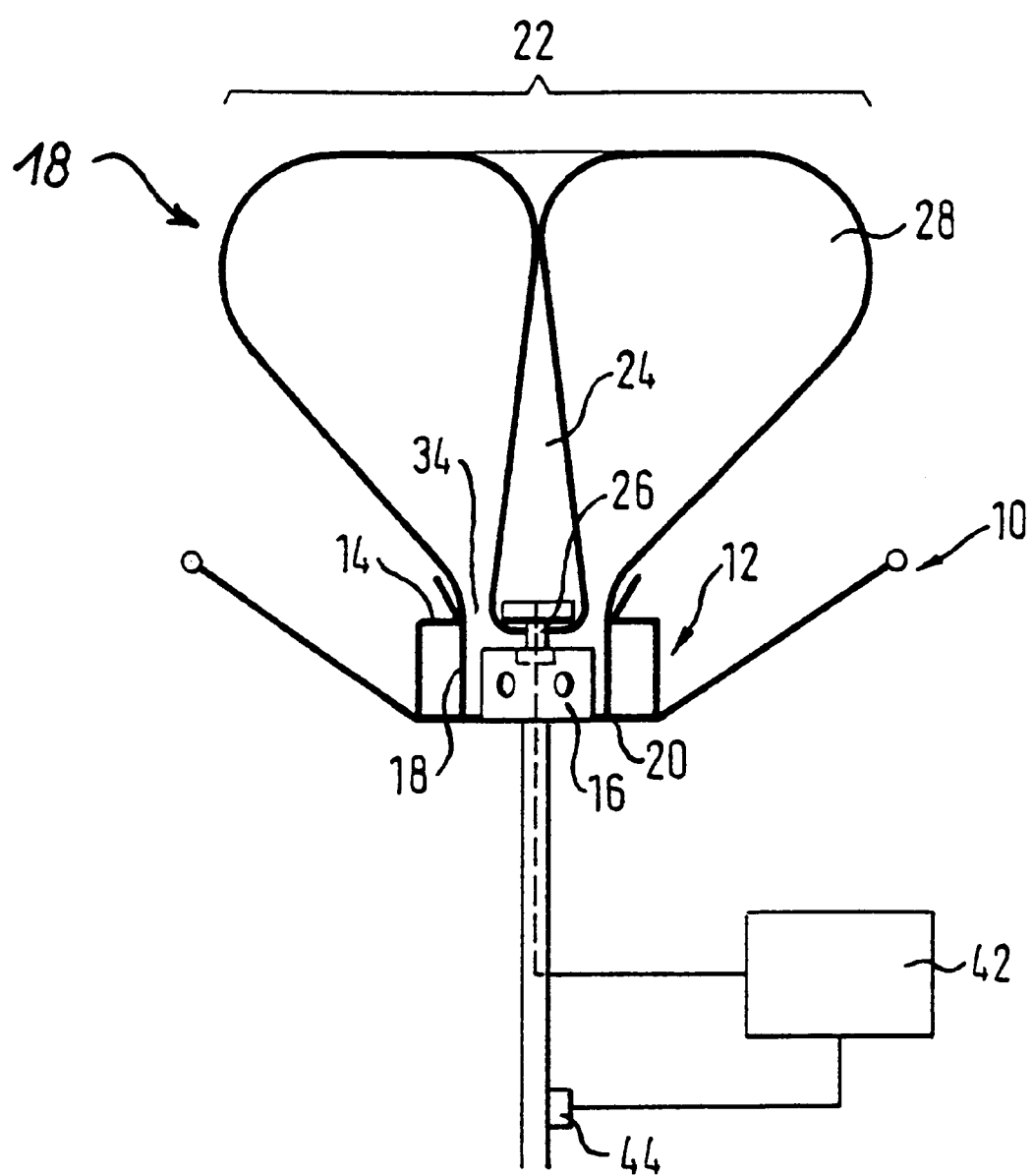
FIG. 2 shows a side view of the steering device shown in FIG. 1 with unfolded gas bag.

FIGS. 1a and 1b show a vehicle steering device with a steering wheel 10, in which a gas bag module 12 is housed in the region of the hub. The steering wheel 10 is illustrated in two differing angular positions. The gas bag module has a covering cap 14 on the front side, in the region of the hub, a gas generator 16 and a gas bag 18. The gas bag is fastened at its outer edge 20 on the base of the gas bag module 12. In relation to the unfolded state (see FIG. 2) the gas bag has a front wall 22 onto which the occupant strikes. The front wall 22 continues into an indentation 24 which is formed in that a central section of the gas bag wall remains fastened to the gas generator 16 via a fastening device 26 and hence is prevented from emerging from the gas bag module 12. Therefore, the gas bag has a ring-shaped form in the inflated state, with a ring-shaped chamber 28.

The covering cap 14 has numerous flaps 30 which are defined by given film hinges or predetermined breaking lines 32. These flaps 30 close a closed annular outlet opening 34 for the gas bag 18. The outlet opening 34 surrounds a display device, provided centrally in the covering cap 14, in the form of a LCD screen 36 which, depending on the desired setting, has at least one of the following functions: speed display, display of a navigation system, radio display, telephone display, WAP screen recall/transmission of e-mails, PC display and the like. Also, the remaining displays already provided hitherto in the vehicle can take place via the LCD screen. Preferably, all screens in the embodiments shown are LCD screens.

The screen 36 is likewise permanently fastened to the gas bag module 12 by means of the fastening device 26, so that on unfolding of the gas bag 18 and tearing open of the covering cap 14, it remains fastened to the steering wheel 10 in a stationary manner and rotates together with the rotating steering wheel. In addition, by means of multi-functional switches 40, various information can be called up and displayed on the screen 36. The screen 36 is coupled with a control arrangement 42 which in turn is connected with a sensor 44 to detect the steering wheel's angular position. In the control arrangement 42, in addition the remaining data are also entered, which are displayed on the screen 36. The control arrangement 42 controls the screen 36 such that independently of the steering angle, the screen always provides a horizontally formed display 46 (see FIG. 1*b*). If the steering wheel 10 is turned, then the display 46 is "turned" electronically about the same angle in the opposite direction, so that despite driving round a bend, the display 46 stands horizontally. The rotated screen 36 is indicated in broken lines.

Figure 3:
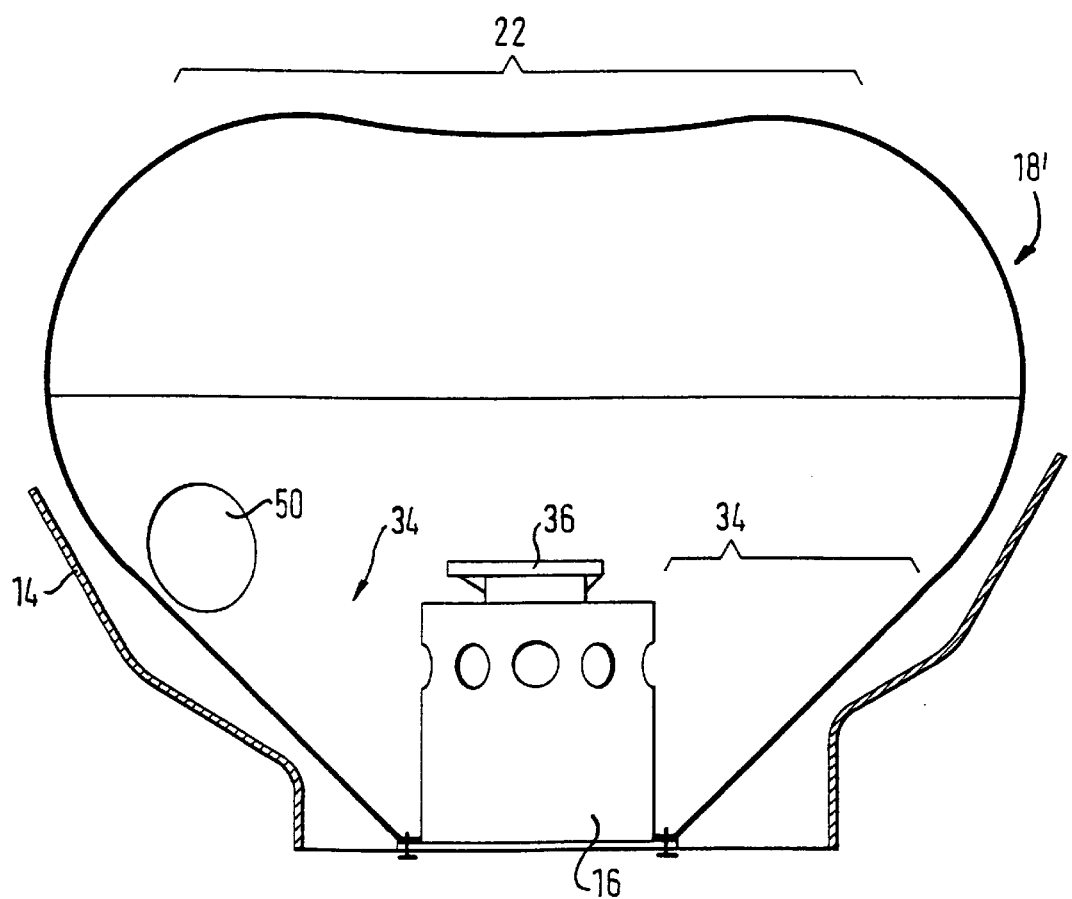
FIG. 3 shows a second embodiment of the steering device according to the invention.

In the embodiment according to FIG. 3, all the reference numbers already introduced in connection with FIG. 2 are used again for parts having the same function. In contrast to the embodiment according to FIG. 2, the gas bag 18' according to FIG. 3 does not have an annular form. Rather, the gas bag has an outflow opening 50 which in the folded state lies underneath the screen 36. On unfolding, the edge of the outflow opening 50 slides upwards along the screen 36, so that finally the screen 36 lies inside the gas bag 18'. In this embodiment, too, the display 46 always remains in horizontal orientation due to the control arrangement 42, although the screen 36 rotates.

Figure 4A:
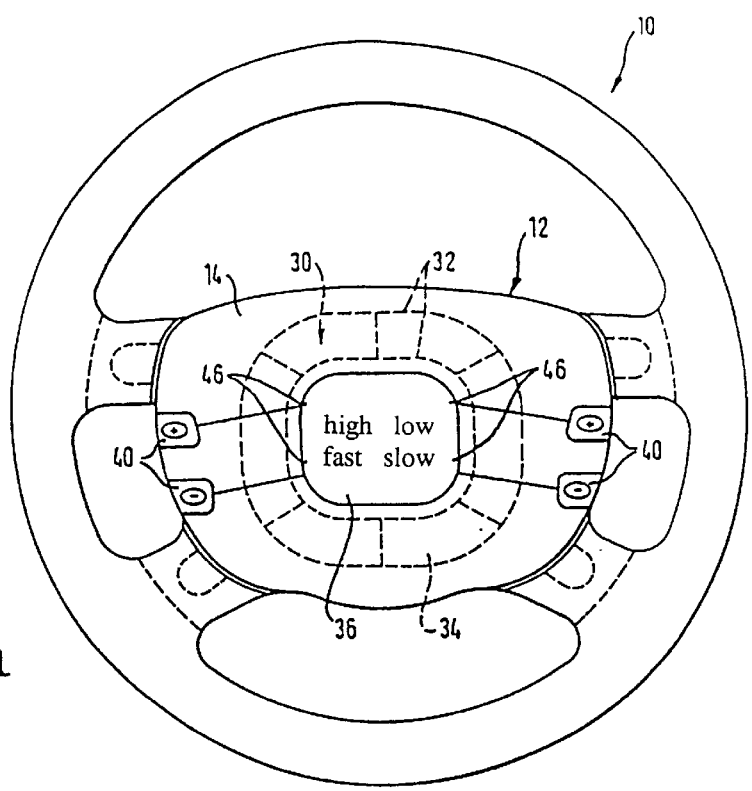
FIGS. 4 to 6 show top views onto further embodiments of the steering device according to the invention.
Figure 4B:
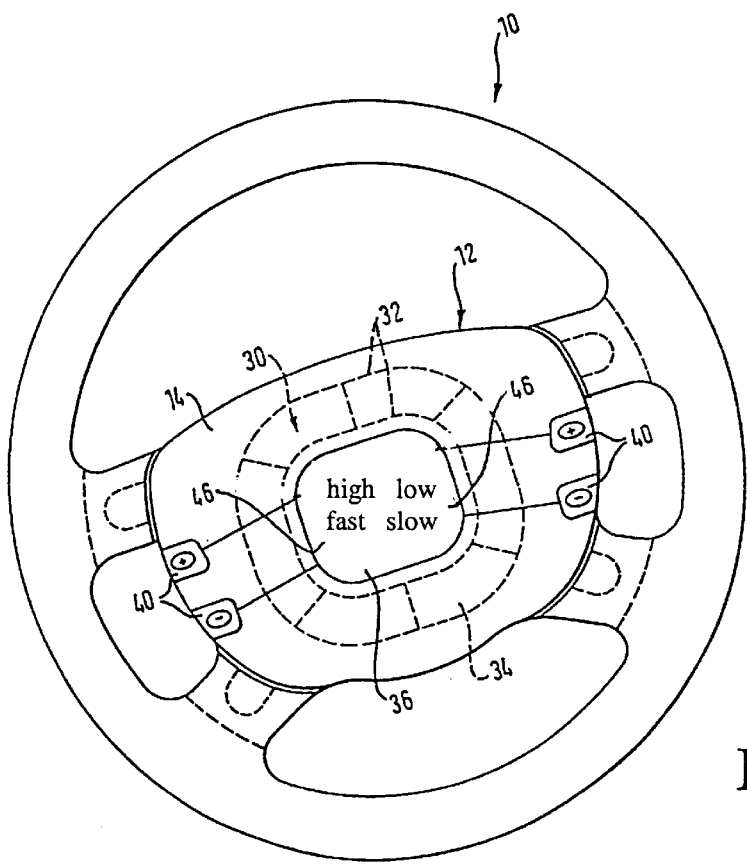
Figure 5A:
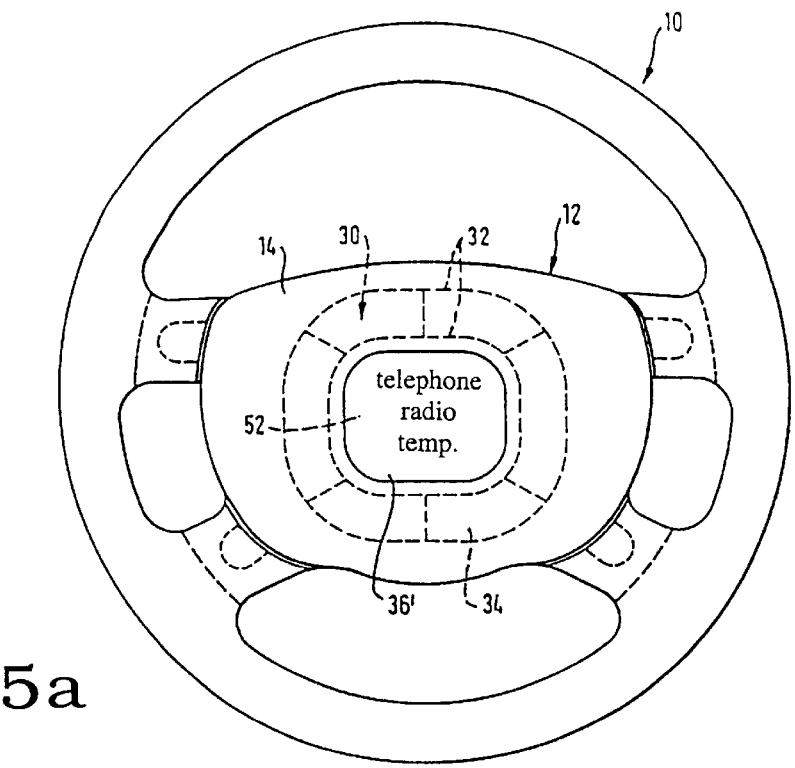
Figure 5B:
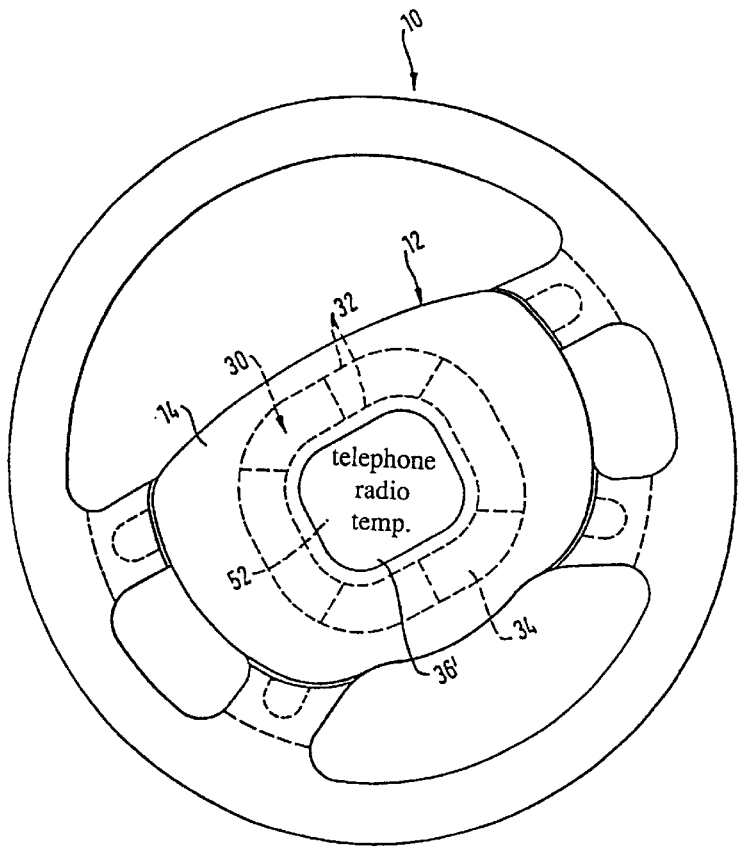

In the embodiment according to FIGS. 4*a* and 4*b*, to the left and right of the display device a pair of multifunctional switches 40 are arranged on the periphery of the covering cap 14. As in the embodiment according to FIG. 2, the display device is coupled with the control arrangement 42, which also applies to the multifunctional switch 40. The control arrangement 42 transmits signals to the display device which delivers a display 46 allocated separately to each multifunctional switch 40 and in fact such that the display indicates which functions are triggered by pressing the corresponding multifunctional switch 40. Thus, for example, the left-hand upper display 46 is associated with the left-hand upper multifunctional switch, by which a speedomat is controlled. A driver who does not know the functions of the multifunctional switch sufficiently is given information in a simple manner via the display—which can also take place by pictograms or the like—how the multifunctional switches are to be operated. The two right-hand multifunctional switches 40 in the state shown are in a setting in which the sound intensity of the radio or telephone can be altered. It is also possible that in a menu-controlled manner, by pressing the multifunctional switches, a jump can be made into other levels which always requires a complicated operation. Hitherto, it was necessary for the driver to know all the levels by heart so as not to have to try continuously by random. Through the invention, the numerous functions of an individual switch are made readily available to the driver. Here too, the display in the form of letters or symbols remains horizontally aligned, even when the screen rotates (see FIG. 4*b*). In the embodiment according to FIGS. 5*a* and 5*b*, a touch screen 36' is arranged centrally in the covering cap 14, which screen 36' represents a combined display- and operating device. Several fields 52 are provided with displays, which are able to be selected on contact, so that a menu is opened. For example, via the field "telephone" the entire screen can be used to display the telephone book, so that access can be made to individual entries very quickly. Functions such as sound intensity or selected frequency can be altered via the field "radio". In FIGS. 5*a* and 5*b* the display in the form of letters or symbols also remains horizontally aligned, even when the screen rotates.

Figure 6A:
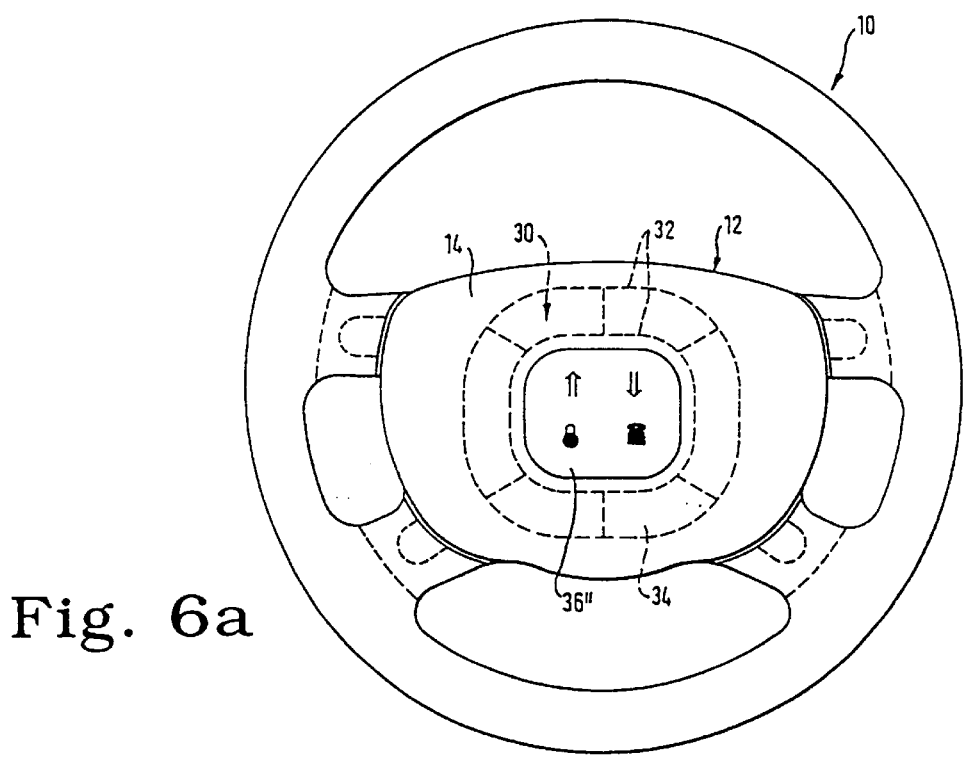
Figure 6B:
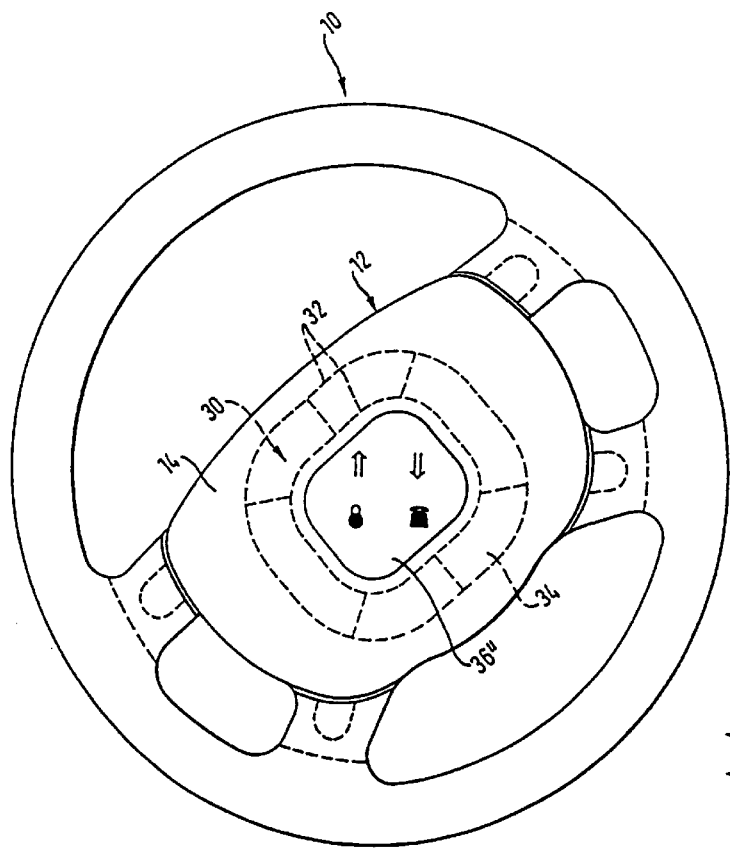

In the embodiment according to FIGS. 6*a* and 6*b*, there is arranged in the center of the covering cap 14 a pure operating element 36" in the form of a touch pad. By means of this operating field, the driver can for example, when the vehicle is stationary, quickly move a pointer to a screen arranged elsewhere and by pressing the touch pad he can select functions. For example, a display could be projected onto the windscreen which can be altered by means of the touch pad, by functions or menus being selected.

Also, a combination of operating elements and display devices is possible in the center of the covering cap 14.

According to the preferred embodiment, the outlet opening 34 is always constructed in a closed ring shape. However, an open ring shape is also possible, for example an outlet opening 34 in the form of a "U".

What is claimed is:

1. A vehicle steering device comprising:
    a rotatable steering wheel which has a gas bag module with a gas bag and a covering cap on a front side, said covering cap closing an outlet opening for said gas bag up until unfolding of said gas bag,
    an electronic display device arranged in said covering cap and remaining fastened stationary on said steering wheel on unfolding of said gas bag, said display device rotating together along with the rotatable steering wheel,
    multifunctional electronic switches coupled with said display device via a control arrangement, said display device providing a display which indicates a function of said multifunctional switches,
    said gas bag, on unfolding, having a front wall onto which an occupant can strike, said gas bag having a central indentation extending from the front wall to said display device in the inflated state of said gas bag, and
    said outlet opening running around said display device.

2. The vehicle steering device according to claim 1, wherein said outlet opening has a closed ring shape.

3. The vehicle steering device according to claim 2, wherein said gas bag has a ring shape on unfolding via said outlet opening.

4. The vehicle steering device according to claim 1, wherein said display device is a screen to display various data corresponding to said multifunctional switches.

5. The vehicle steering device according to claim 4, wherein said screen is constructed for at least one of the following information reproduction purposes:
    speed display,
    navigation display,
    PC display,
    radio display, and
    telephone display.

6. The vehicle steering device according to claim 1, wherein a steering angle detection sensor is coupled via a control arrangement with said display device, said display device always providing a horizontally aligned display independently of the angular position of the steering wheel.

7. The vehicle steering device according to claim 1, wherein an operating device is arranged in the part of the covering pad which remains stationary on unfolding of the gas bag so as to form a combined display and operating device.

8. The vehicle steering device according to claim 7, wherein said combined display and operating device is a touch screen.

9. The vehicle steering device according to claim 1, wherein in said covering cap an operating device is provided in the form of a touch pad.

10. A vehicle steering device comprising:

a steering wheel which has a gas bag module with a gas bag and a covering cap on a front side, said covering cap closing an outlet opening for said gas bag until unfolding of said gas bag, an electronic display device arranged in said covering cap and remaining fastened stationary on said steering wheel on unfolding of said gas bag, a steering angle detection sensor coupled via a control arrangement with said display device, said gas bag, on unfolding, having a front wall onto which an occupant can strike, which front wall has a central indentation extending to said display device in the inflated state of said gas bag, said outlet opening running around said display device, and said display device always providing a horizontally aligned display independently of the angular position of the steering wheel.

11. The vehicle steering device according to claim 10, wherein an operating device is arranged in the part of the covering pad which remains stationary on unfolding of the gas bag so as to form a combined display and operating device.

12. The vehicle steering device according to claim 11, wherein said combined display and operating device is a touch screen.

13. The vehicle steering device according to claim 11, wherein said combined display and operating device is a touch pad.

* * * * *